Jan. 22, 1935. V. A. BERGHOEFER 1,988,776
TEMPERATURE CONTROLLED VALVE
Filed Nov. 21, 1932 2 Sheets-Sheet 1

INVENTOR.
VICTOR A. BERGHOEFER.
BY
ATTORNEY.

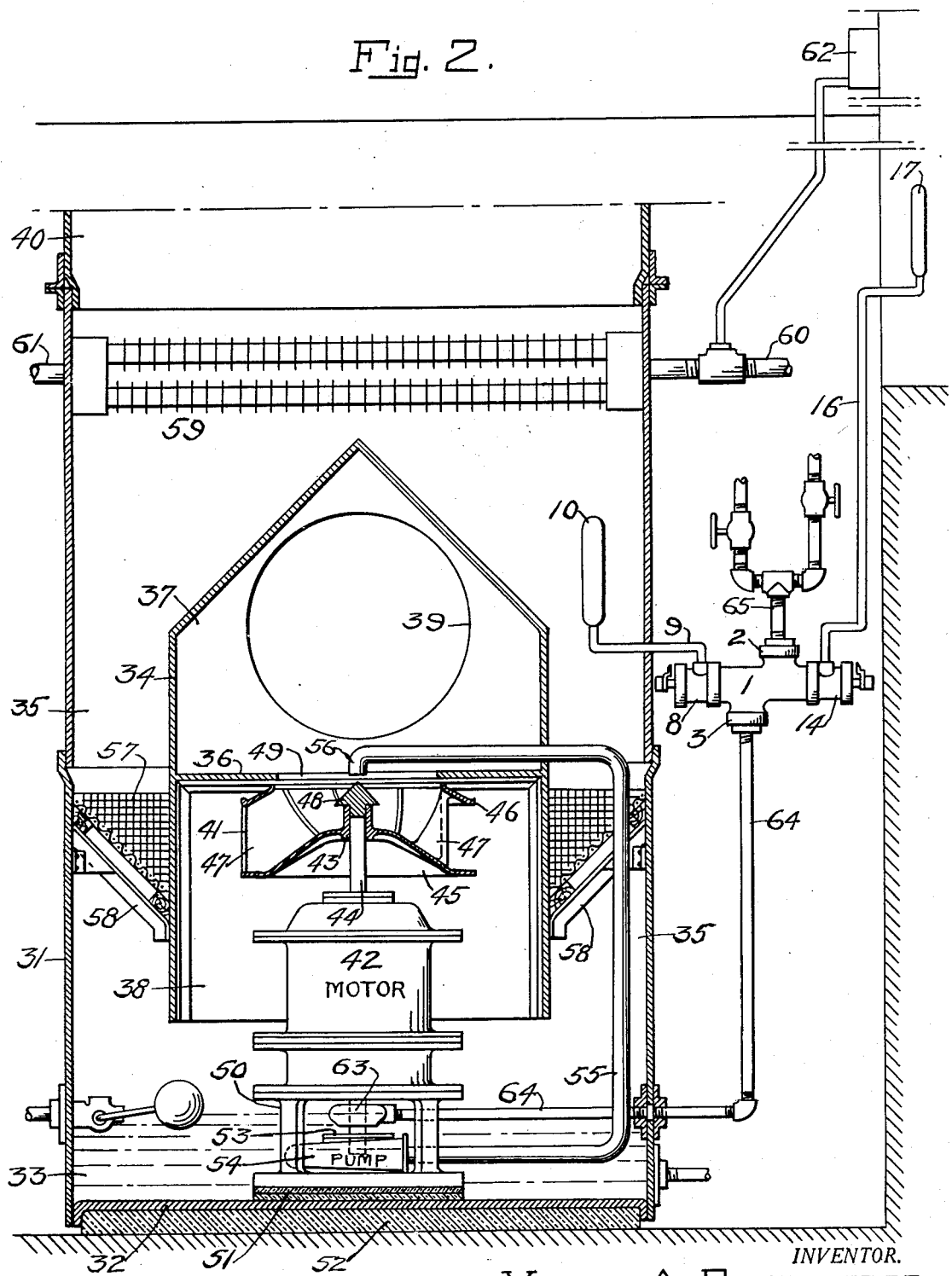

Patented Jan. 22, 1935

1,988,776

UNITED STATES PATENT OFFICE 1,988,776

TEMPERATURE CONTROLLED VALVE

Victor A. Berghoefer, Milwaukee, Wis., assignor to Sterling Engineering Company, Milwaukee, Wis., a corporation of Wisconsin Application November 21, 1932, Serial No. 643,614

17 Claims. (Cl. 236—99)

This invention relates to temperature controlled valves of the type ordinarily employed to vary the flow of fluids in response to variations in temperature.

The temperature controlled valve to which the invention applies in particular is provided with a casing having an inlet thereto and an outlet therefrom, a valve for controlling the flow of fluid from the inlet to the outlet, a fluid-filled expansible chamber or bellows for operating the valve, and means for varying the pressure in the expansible chamber or bellows in response to variations in temperature to cause it to operate the valve and thereby vary the flow of fluid through the casing.

The invention has as an object to provide a temperature controlled valve which will control the flow of a fluid in accordance with the temperature prevailing in one place or medium and to modify this flow of fluid in response to variations in the temperature of another place or medium, such as in an air conditioning apparatus in which it is desired to vary a flow of water in response to variations in the temperature of the air being conditioned and to reduce this flow of water in response to a reduction in atmospheric temperature in order to prevent moisture from condensing upon the outer walls of the structure in which the air is being conditioned.

Another object is to provide a temperature controlled valve which may be readily and easily adjusted to adapt it for use under various conditions.

Another object is to provide a valve of this character which is self-contained.

Another object is to provide a temperature controlled valve which is simple, compact and durable.

Another object is to provide a temperature controlled valve which may be readily and economically manufactured.

According to the invention in its general aspect and as ordinarily embodied in practice, the temperature controlled valve is provided with a casing having an inlet thereto and an outlet therefrom, a valve for controlling the flow of fluid from the inlet to the outlet, temperature responsive means for operating the valve to vary the flow of fluid through the casing in response to variations in temperature, and a second temperature responsive means for modifying the action of the first temperature responsive means to thereby modify the flow of fluid through the casing.

According to the invention in another aspect, the valve which controls the flow of fluid through the casing is operated through a fluid-filled expansible chamber or bellows, and the fluid pressure in this chamber or bellows is regulated by adjusting another expansible chamber or bellows.

The invention is exemplified by the temperature controlled valve shown in the accompanying drawings in which the views are as follows:

Fig. 2 is a diagram showing the valve applied to an air conditioning apparatus.

Fig. 1

Figure 1:
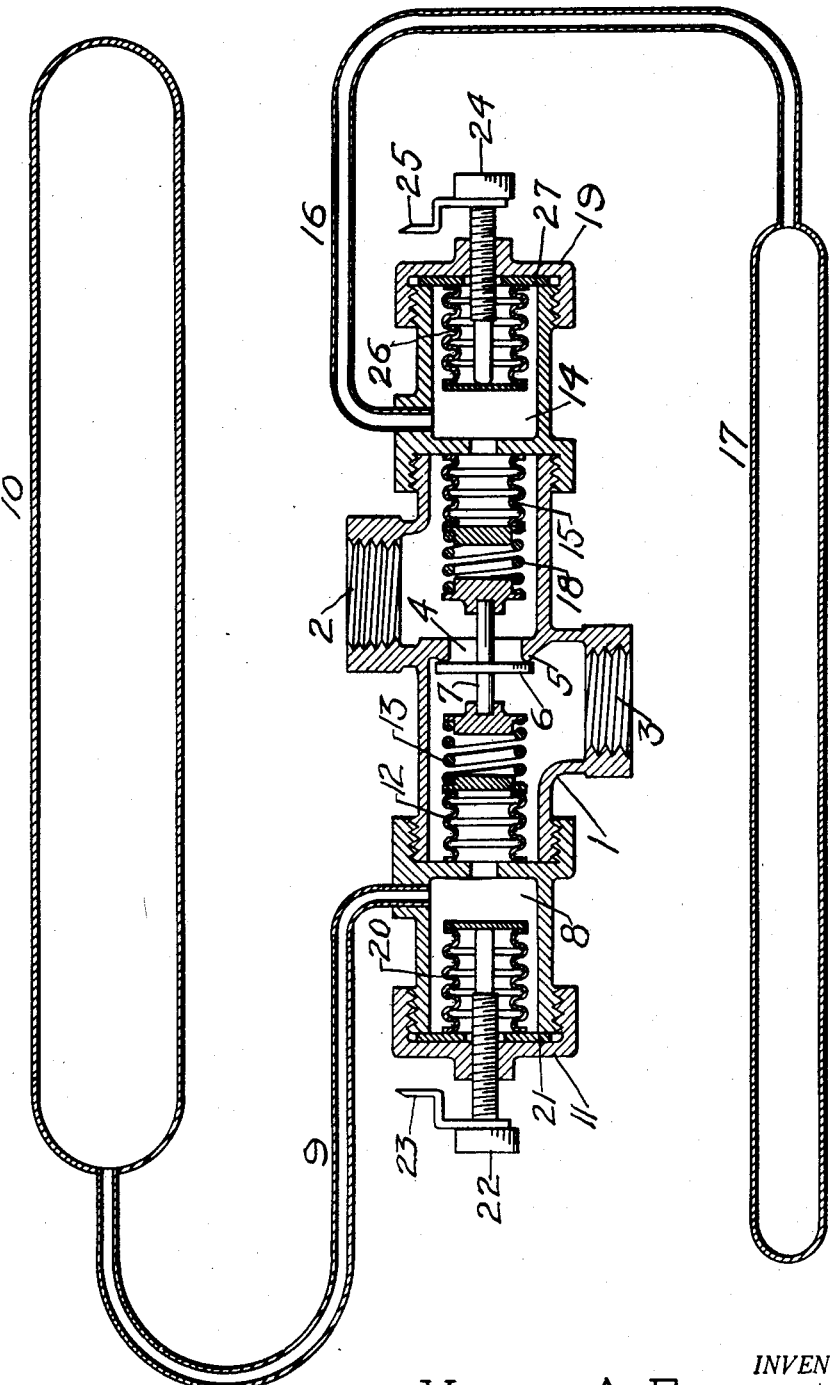
Fig. 1 is a diagrammatic view showing the valve in longitudinal section.

This valve has its operating mechanism arranged within a casing 1 which is provided with an inlet 2 for connection to source of fluid, an outlet 3 which communicates with the inlet 2 through a port 4 having an annular valve seat 5 arranged around its periphery, a valve 6 which coacts with the valve seat to control the flow of fluid from the inlet to the outlet, and a valve stem 7 which is connected to the valve 6 and extends from both sides thereof to operate it.

The valve 6 is urged toward the valve seat 5 by temperature responsive mechanism arranged at one end of the valve stem 7, and the action of this temperature responsive mechanism upon the valve 6 is modified by a second temperature responsive mechanism which is arranged at the other end of the valve stem 7 and tends to urge the valve 6 away from the valve seat 5.

The temperature responsive mechanism which urges the valve 6 toward the valve seat 5 is provided with a pressure chamber 8 which is arranged at the end of the casing 1 and connected by a tube 9 to a bulb 10.

The pressure chamber 8 is closed at its outer end by a cap 11 and at its inner end by an expansible chamber or bellows 12 which forms substantially a part thereof.

The bellows 12 is arranged within the end of the casing 1 to expand and contract toward and from the valve seat 5, and a helical compression spring 13 is arranged between it and the end of the valve stem 7 to transmit motion to the valve 6 during expansion of the bellows 12.

The temperature responsive mechanism which tends to urge the valve 6 away from the valve seat 5 is provided with a pressure chamber 14 which is arranged at the other end of the casing 1, an expansible chamber or bellows 15 which is arranged within the end of the casing 1 and connected to the chamber 14 to form substantially a part thereof, a tube 16 connecting the chamber 14 to a bulb 17, a helical compression spring 18 arranged between the bellows 15 and the end of the valve stem 7, and a cap 19 closing the outer end of the chamber 14, all of which are substantially the same as the corresponding parts of the other temperature responsive mechanism except such variations in size as may be necessary to meet the requirements of the particular apparatus in which the invention is to be incorporated.

The pressure chambers, bellows, tubes and bulbs of both mechanisms are completely filled with fluid which will vary in volume in response to variations in temperature and thereby cause the bellows to expand and contract toward and from the valve seat 5 to operate the valve 6. For instance, they may be filled with a liquid which varies in volume in response to variations in temperature, such as oil, or the pressure chambers, bellows and tubes may be filled with either a stable liquid or with air and the bulbs filled with a suitable gas or with a volatile liquid which has a low boiling point.

An increase in the temperature of the fluid in the bulb 10 will cause it to expand and force additional fluid into the bellows 12 to expand it. The expanding bellows 12 will either move the valve 6 toward the valve seat 5, or, if the valve 6 is restrained from movement by opposing forces, it will exert thereon through the spring 13 a force which is substantially proportional to the increase in temperature.

Conversely, a reduction in the temperature of the fluid in the bulb 10 will cause it to contract and permit the spring 18 and any fluid pressure prevailing in the inlet 2 to move the valve 6 away from the valve seat 5.

Similarly, an increase in the temperature of the fluid in the bulb 17 will either cause the valve 6 to be moved away from the valve seat 5 or will cause to be exerted upon the valve 6 a force substantially proportional to the increase in temperature, and a decrease in the temperature of the fluid in the bulb 17 will decrease the force exerted by the spring 18 and thereby permit the spring 13 to move the valve 6 toward the valve seat 5.

If the volumetric capacity of the bulb 17 differs from that of the bulb 10, the effect upon the valve 6 produced by the fluid in each bulb in response to the same variation in temperature will be proportional to the volumetric capacities of the two bulbs.

For instance, if the volumetric capacity of the bulb 17 is one-half that of the bulb 10, a decrease of a given number of degrees in the temperature of the fluid in the bulb 10 will cause a given increase in the flow of fluid through the valve, and a succeeding decrease of the same number of degrees in the temperature of the fluid in the bulb 17 will cause the flow of fluid through the valve to be decreased an amount equal to one-half of that increase.

The fluid in each of the temperature responsive mechanisms is ordinarily kept under a low pressure, and this pressure may be regulated at any given temperature by varying the capacity of the pressure chamber, as by providing the pressure chamber with a displacement member and varying the displacement thereof.

As shown, an expansible chamber or bellows 20 is arranged within the pressure chamber 8 and closed at its outer end by being attached either directly to the cap 11 or attached to an annular metal gasket 21 arranged beneath the cap.

The bellows 20 may be expanded or contracted, to vary the capacity of the chamber 8, by an adjusting screw 22 which is threaded through the cap 11 into engagement with the bottom of the bellows 20 and provided upon its outer or head end with a pointer 23 to coact with a suitable scale (not shown) and indicate the pressure in the chamber 8 at a given temperature.

The fluid pressure in the other temperature responsive mechanism is regulated in a similar manner by turning an adjusting screw 24 which is provided with an indicating pointer 25 and threaded through the cap 19 into engagement with the bottom of an expansible chamber or bellows 26 arranged within the chamber 14. The bellows 26 is connected at its outer end to a gasket 27 arranged beneath the cap 19.

The screws 22 and 24 are ordinarily so adjusted that a predetermined maximum temperature of the fluid in the bulb 10 and a predetermined minimum temperature of the fluid in the bulb 17 will cause the liquid in the chambers 8 and 14 to have certain pressures which, acting through the bellows 12 and 15, will cause the springs 13 and 18 to exert upon the valve stem 7 opposing forces the resultant of which will be just sufficient to hold the valve 6 closed against any fluid pressure prevailing in the inlet 2.

Then, whenever the temperature of the fluid in the bulb 10 is less than the predetermined maximum, or whenever the temperature of the fluid in the bulb 17 is greater than the minimum, the resultant of the forces exerted by the springs 13 and 18 will be decreased and the valve 6 will open a distance or degree which is substantially proportional to the variation in the temperatures of the fluid in the bulbs.

*Fig. 2*

For the purpose of illustration, the invention is shown as being employed in conjunction with an air conditioning apparatus such as that described and claimed in copending application Serial No. 650,813 filed January 9, 1933 by George C. Bush.

This air conditioning apparatus consists primarily of an air treating unit for treating a current of air drawn from a room or rooms in which the air is to be conditioned, intake and discharge passages for conducting the current of air from the room to the air treating unit and for returning the treated air thereto, and means for controlling the temperature and the humidity of the air.

The air treating unit has its mechanism arranged within an outer casing 31 which is supported upon a floor or other foundation and closed at its lower end by a bottom plate 32 to provide therein a reservoir 33 which ordinarily contains a supply of water.

The outer casing 31 encloses and supports an inner casing 34 which is smaller than the outer casing to provide an air passage 35 between the walls of the two casings. The inner casing is divided intermediate its ends by a horizontal partition 36 into an upper substantially closed intake compartment 37 and a lower humidifying compartment 38 which is open at its bottom and spaced above the water in the reservoir 33.

The intake compartment 37 has connected thereto an intake passage or pipe 39 which extends through the wall of the outer casing 31 to conduct air to the unit from the room in which the air is to be conditioned.

Air from the unit is returned to the room through a discharge passage or distributing chamber 40 which is connected to the upper end of the outer casing 31.

Air is drawn through the intake passage 39 and the intake compartment 37 into the humidifying compartment 38 by a fan 41 which is arranged within the humidifying compartment 38 and rotated by an electric motor 42.

The fan 41 is ordinarily an integral unit having a central hub 43 which is fastened to the upper end of the shaft 44 of the motor 42, a circular bottom plate 45 which closes the bottom of the fan and extends downward and radially outward from the hub 43, an annular top plate 46 which is arranged above the bottom plate 45 and has its outer edge substantially in vertical alinement with the outer edge thereof, and a number of arcuate fan blades 47 which are arranged between the bottom plate 45 and the top plate 46 and joined thereto.

The fan is also provided with a conical water deflector 48 which is carried by the hub 43 upon the upper end thereof to deflect water radially outward upon the fan blades 47 and the bottom plate 45.

The fan is arranged within the humidifying compartment 38 with the opening in the top plate 46 in registry with an opening 49 which is formed in the partition 36 at or near the center thereof. The opening 49 constitutes the outlet for the intake compartment 37, the opening in the top plate 46 constitutes the intake of the fan 41, and the top plate 46 closes the top of the fan outside its intake.

The motor 42 is arranged in a vertical position within the casing 31 and supported upon a pedestal 50 which is carried by the bottom plate 32. The motor 42 is ordinarily sound insulated as by means of a rubber pad 51 arranged between the pedestal 50 and the bottom plate 32 and by a cork pad 52 arranged between the bottom plate 32 and the floor or foundation upon which the unit is supported.

The motor shaft 44 extends downward into the pedestal 50 and into the intake 53 of a rotary pump 54 which is arranged within the pedestal 50 and has its rotor attached to the lower end of the shaft 44 whereby the motor 52 may drive both the pump 54 and the fan 41.

The pump 54 has its outlet connected to a discharge pipe 55 which extends upward and into the intake compartment 37 and terminates in a nozzle 56 arranged vertically above the fan 41 and in alinement with the water deflector 48.

When the motor 42 is in operation, the pump 54 forces water through the pipe 55 and its nozzle 56 onto the fan 41 which atomizes the water and simultaneously draws air through the opening 49 from the intake compartment 37 and forces it through the humidifying compartment 38 and through the atomized water therein, thereby washing and substantially saturating this current of air.

The air drawn through the opening 49 is propelled radially outward by the fan 41 but, as the inner casing 34 is open only at its bottom and as the outer casing 31 is closed except at its top, the sidewall of the compartment 38 functions as a baffle and causes the air to pass vertically downward until it can pass underneath the bottom of the inner casing and to then pass upward through the passage 35, thereby deflecting the current of air through an angle of approximately 180°.

This abrupt deflection of the air current causes water entrained therein to be precipitated therefrom by its own velocity.

This current of air passes through an eliminator 57 which may be a wire screen of suitable mesh arranged across the passage 35 and supported by braces 58 which may also fasten the inner casing 34 to the outer casing 31 and support it therein.

The eliminator 57 collects excess water carried by the current of air and allows it to drain into the reservoir 33 whereby the air delivered to the upper part of the casing 31 is saturated to substantially the dew point but is free from excess moisture or entrained water.

During cold weather, the humidified air is ordinarily heated before being returned to the room which may be heated solely by this air or may be provided with other heat in addition thereto.

If the building in which the room is located is heated by steam or hot water, heating coils or radiators may be arranged in or below the discharge passage 40, such as the radiators 59 which are shown arranged in the upper part of the casing 31 and connected to a steam or hot water supply pipe 60 and to a return pipe 61. The supply of steam or hot water delivered to the radiators 59 is ordinarily controlled by a thermostat 62 arranged in the room.

When the temperature of the air discharged from the humidifying compartment 38 is above a predetermined minimum, the pump 54 may draw its supply of water solely from the reservoir 33 the water in which is ordinarily maintained at approximately a predetermined temperature.

In order to increase the temperature of the water delivered to the fan 41 and thereby increase both the temperature and the moisture content of the air discharged from the humidifying compartment 38, water hotter than the water in the reservoir 33 is delivered to the pump 54 through a nozzle 63 which is arranged close to the intake 53 and ordinarily encircles the motor shaft 44.

The nozzle 63 is attached to the lower end of a delivery pipe 64 which extends through the wall of the casing 31 and has its upper end connected to the outlet 3 of a temperature controlled valve such as that shown in Fig. 1.

This valve has its bulb 10 arranged within the casing 31 and in the path of the air discharged from the humidifying compartment 38, its bulb 17 arranged outside the building containing the room in which the air is being conditioned, and its inlet 2 connected by a supply pipe 65 to a suitable source of hot water.

The fluid pressures in the chambers 8 and 14 are adjusted, as previously described, to keep the valve 6 in engagement with its seat 5 whenever the temperature of the fluid in the bulb 10 exceeds a predetermined maximum, then when the temperature of the humidified air passing over the bulb 10 drops and causes a corresponding decrease in the temperature of the fluid in the bulb 10, the valve 6 is moved away from its seat 5 and hot water flows from the pipe 65 to the pump 54 and raises the temperature of the humidifying water delivered to the fan 41.

Raising the temperature of the humidifying water raises the temperature of the humidified air and the moisture carrying capacity thereof. As the temperature of the humidified air rises, the liquid in the bulb 10 expands and causes the valve 6 to move toward its seat and reduce the flow of hot water to the humidifier.

The flow of hot water through the temperature controlled valve is thus varied in response to variations in the temperature of the air heated by that water.

During cold weather, it is desirable to keep the humidity of the air within a room below the point at which moisture will condense upon the windows. When the outside temperature drops, the fluid in the bulb 17 will contract and reduce the pressure in the chamber 14 and the tension of the spring 18. This reduction in the tension of the spring 18 permits the bellows 12 to move the valve 6 toward its seat in response to a temperature which is lower than the temperature required to move it toward its seat when the outside temperature is higher, thereby reducing the moisture content of the air discharged from the humidifying compartment 38 and the relative humidity of the air within the room.

The invention herein set forth is susceptible of various modifications and adaptations without departure from the scope thereof as hereafter claimed.

The invention is hereby claimed as follows:

1. A temperature controlled valve, comprising a casing having an inlet thereto and an outlet therefrom, a valve for controlling the flow of fluid from said inlet to said outlet, means responsive to variations in temperature outside said casing for operating said valve to vary the flow of fluid through said casing, and other means opposing the action of the aforesaid means and responsive to variations in temperature outside said casing to further vary said flow of fluid.

2. A temperature controlled valve, comprising a casing having an inlet thereto and an outlet therefrom, a valve for controlling the flow of fluid from said inlet to said outlet, fluid operated means responsive to variations in temperature outside said casing for operating said valve to vary the flow of fluid through said casing, other fluid operated means opposing the action of the aforesaid means and responsive to variations in temperature outside said casing to further vary said flow of fluid, and means for adjusting the fluid pressure in said fluid operated means.

3. A temperature controlled valve, comprising a casing having an inlet thereto and an outlet therefrom, a valve for controlling the flow of fluid from said inlet to said outlet, fluid operated means responsive to variations in temperature outside said casing for operating said valve to vary the flow of fluid through said casing, other fluid operated means opposing the action of the aforesaid means and responsive to variations in temperature outside said casing to further vary the flow of said fluid, an expansible bellows arranged within each of said fluid operated means, and means for varying the displacement of said bellows to thereby vary the fluid pressure in said fluid operated means.

4. A temperature controlled valve, comprising a casing having an inlet thereto and an outlet therefrom, a valve controlling communication between said inlet and said outlet, fluid actuated means arranged within said casing for urging said valve in a direction to close it, other fluid actuated means arranged within said casing for urging said valve in the opposite direction against the action of the aforesaid means to modify the action thereof and temperature responsive means connected to each of said fluid actuated means and having a part thereof arranged outside said casing to operate said fluid actuated means in response to variations in outside temperature.

5. A temperature controlled valve, comprising a casing having an inlet thereto and an outlet therefrom, a valve controlling communication between said inlet and said outlet, fluid operated means arranged within said casing for urging said valve in a direction to close it, other fluid operated means arranged within said casing for urging said valve in the opposite direction against the action of the aforesaid means to modify the action thereof, temperature responsive means connected to each of said fluid actuated means and having a part thereof arranged outside said casing to operate said fluid actuated means in response to variations in outside temperature and means for adjusting the fluid pressure in said fluid operated means.

6. A temperature controlled valve, comprising a casing having an inlet thereto and an outlet therefrom, a valve controlling communication between said inlet and said outlet, fluid-operated means arranged within said casing for urging said valve in a direction to close it, other fluid-operated means arranged within said casing for urging said valve in the opposite direction against the action of the aforesaid means to modify the action thereof, temperature responsive means connected to each of said fluid actuated means and having a part thereof arranged outside said casing to operate said fluid actuated means in response to variations in outside temperature an expansible bellows arranged within each of said fluid-operated means, and means for varying the displacement of said bellows to thereby vary the fluid pressure in said fluid-operated means.

7. A temperature controlled valve, comprising a casing having an inlet and an outlet, a valve for controlling the flow of fluid from said inlet to said outlet, a fluid-filled expansible chamber for operating said valve, means for varying the pressure in said chamber in response to variations in the temperature of one place or medium outside said casing to cause said chamber to operate said valve and vary the flow of fluid through said casing, a second fluid-filled chamber for opposing the action of the aforesaid chamber, and means for varying the pressure in said second chamber in response to variations in the temperature of another place or medium outside said casing to cause said second chamber to modulate the flow of fluid through said casing.

8. A temperature controlled valve, comprising a casing having an inlet and an outlet, a valve for controlling the flow of fluid from said inlet to said outlet, a fluid-filled expansible chamber for operating said valve, means for varying the pressure in said chamber in response to variations in the temperature of one place or medium outside said casing to cause said chamber to operate said valve and vary the flow of fluid through said casing, a second fluid-filled chamber for opposing the action of the aforesaid chamber, means for varying the pressure in said second chamber in response to variations in the temperature of another place or medium outside said casing to cause said second chamber to modulate the flow of fluid through said casing, and means for manually adjusting the fluid pressure in each of said chambers.

9. A temperature controlled valve, comprising a casing having an inlet thereto and an outlet therefrom, a valve for controlling the flow of fluid from said inlet to said outlet, a fluid filled expansible bellows arranged at each end of said casing and acting upon said valve in opposite directions, resilient means interposed between each bellows and said valve and through which said bellows acts upon said valve, and a bulb connected to each of said bellows and filled with an expansible fluid whereby an increase in the temperature of one bulb will effect an increase in pressure in one of said bellows and cause said valve to decrease the flow of fluid through said casing and an increase in the temperature of the other bulb will effect an increase in pressure in the other bellows and cause said valve to increase the flow of fluid through said casing.

10. A temperature controlled valve, comprising a casing having an inlet thereto and an outlet therefrom, a valve for controlling the flow of fluid from said inlet to said outlet, a fluid filled expansible bellows arranged at each end of said casing and acting upon said valve in opposite directions, resilient means interposed between each bellows and said valve and through which said bellows acts upon said valve, a bulb connected to each of said bellows and filled with an expansible fluid whereby an increase in the temperature of one bulb will effect an increase in pressure in one of said bellows and cause said valve to decrease the flow of fluid through said casing and an increase in the temperature of the other bulb will effect an increase in pressure in the other bellows and cause said valve to increase the flow of fluid through said casing, and manually operated means for adjusting the pressure in each of said bellows.

11. A temperature controlled valve, comprising a casing having an inlet thereto and an outlet therefrom and a fluid-filled pressure chamber arranged therein, a valve for controlling the flow of fluid from said inlet to said outlet, a fluid-filled expansible bellows connected to said chamber and supporting said valve whereby variations in pressure in said chamber will vary the length of said bellows and thereby operate said valve, a bulb connected to said chamber and adapted to be placed in the path of a heat transferring medium, an expansible fluid filling said bulb whereby variations in the temperature of said medium will cause a variation in the pressure in said chamber and thereby operate said valve to vary the flow of fluid through said casing, an expansible bellows arranged within said chamber, and means for adjusting the length of said bellows to regulate the pressure in said chamber.

12. A temperature controlled valve, comprising a casing having an inlet thereto and an outlet therefrom and a fluid-filled pressure chamber arranged therein, a valve for controlling the flow of fluid from said inlet to said outlet, a fluid-filled bellows connected to said chamber and supporting said valve whereby variations in pressure in said chamber will vary the length of said bellows and thereby operate said valve, a bulb connected to said chamber and adapted to be placed in the path of a heat transferring medium, an expansible fluid filling said bulb whereby variations in the temperature of said medium will cause a variation in the pressure in said chamber and thereby operate said valve to vary the flow of fluid through said casing, a displacement member arranged within said chamber, and other means responsive to variations in temperature for modifying the action of said fluid filled bellows upon said valve to thereby further vary the flow of fluid through said casing.

13. A temperature controlled valve, comprising a casing having an inlet thereto and an outlet therefrom and a fluid-filled pressure chamber arranged therein, a valve for controlling the flow of fluid from said inlet to said outlet, a fluid-filled expansible bellows connected to said chamber and supporting said valve whereby variations in pressure in said chamber will vary the length of said bellows and thereby operate said valve, a bulb connected to said chamber and adapted to be placed in the path of a heat transferring medium an expansible fluid filling said bulb whereby variations in the temperature of said medium will cause a variation in the pressure in said chamber and thereby operate said valve to vary the flow of fluid through said casing, an expansible bellows arranged within said chamber, and other means responsive to variations in temperature for modifying the action of said fluid filled bellows upon said valve to thereby further vary the flow of fluid through said casing.

14. The combination, with a casing, of a valve arranged within said casing for controlling the flow therethrough of a fluid employed to heat a heat-transferring medium, means responsive to temperatures created in said heat-transferring medium and including an expansible member for operating said valve to vary the flow of said fluid in response to variations in said temperature, and other means including another expansible member for opposing the action of the aforesaid member and responsive to temperatures created independently of said fluid to thereby further vary the flow of said fluid in accordance with variations in said independently created temperature.

15. The combination, with a casing, of a valve arranged within said casing for controlling the flow therethrough of a fluid employed to heat a heat-transferring medium, means responsive to temperatures created in said heat-transferring medium and including an expansible member for operating said valve to vary the flow of said fluid in response to variations in said temperature, other means including another expansible member for opposing the action of the aforesaid member and responsive to temperatures created independently of said fluid to thereby further vary the flow of said fluid in accordance with variations in said independently created temperature, and resilient means interposed between each of said members and said valve.

16. The combination, with a casing, of a valve arranged within said casing for controlling the flow therethrough of a fluid employed to heat a heat-transferring medium, fluid operated means responsive to temperatures created in said heat-transferring medium and including an expansible member for operating said valve to vary the flow of said fluid in response to variations in said temperature, other fluid operated means including another expansible member for opposing the action of the aforesaid member and responsive to temperatures created independently of said fluid to thereby further vary the flow of said fluid in accordance with variations in said independently created temperature, and means for adjusting the fluid pressure in said fluid operated means.

17. The combination, with a casing, of a valve arranged within said casing for controlling the flow therethrough of a fluid employed to heat a heat-transferring medium, fluid operated means responsive to temperatures created in said heat transferring medium and including an expansible member for operating said valve to vary the flow of said fluid in response to variations in said temperature, other fluid operated means including another expansible member for opposing the action of the aforesaid member and responsive to temperatures created independently of said fluid, to and thereby further vary the flow of said fluid in accordance with variations in said independently created temperature, means for adjusting the fluid pressure in said fluid operated means, and resilient means interposed between each member and said valve.

VICTOR A. BERGHOEFER.